UNITED STATES PATENT OFFICE.

ROBERT W. HOWELL, OF KIRKWOOD, MISSOURI.

ARTIFICIAL FUEL.

941,577. Specification of Letters Patent. Patented Nov. 30, 1909.

No Drawing. Application filed June 6, 1908. Serial No. 437,421.

*To all whom it may concern:*

Be it known that I, ROBERT W. HOWELL, a citizen of the United States, residing at Kirkwood, in the county of St. Louis and State of Missouri, have invented a new and useful Artificial Fuel, of which the following is a specification.

My object is to utilize waste vegetable material, such as corn-stalks, weeds, brush wood, and the like, for making artificial fuel in the form of fagots adapted to prevent the absorption of water and to be conveniently handled, stored, preserved and advantageously burned in stoves, furnaces or otherwise, to produce light and heat whenever desired.

My invention consists in the fuel and method of making it as hereinafter set forth and pointed out in my claim.

I first reduce corn-stalks, weeds, wood and all kinds of waste vegetable matter that is porous and adapted to absorb oil, into short length, preferably ten or twelve inches long, and then saturate them with cheap crude oil and after they are soaked with combustible (preferably crude petroleum) oil, I then bundle them into fagots and press them together compactly and retain them together by means of cords and then coat them with hard tar, preferably coal tar melted and hot as required to prevent the evaporation of the oil and to dry and harden the tar that is absorbed by the fagots and adheres on the surface of the fibrous material. To facilitate the operation and reduce cost I melt and heat the tar in a tank and convey the fagots on an endless carrier and as it passes the tank I spray the hot melted tar over the fagots. The oil and the tar thus combined with the fibrous and porous vegetable matter largely increases the combustible qualities of the fagots for use as fuel, disposes of obnoxious waste matter on farms or wherever found and is a great convenience wherever an economical fuel and light and heat is wanted.

The wood is a solid combustible material that is rigid and the corn stalks and weeds are light in weight and pliable and can be readily combined with the wood and compressed as required to produce compact fagots by means of combustible cords in such a manner that the bound fagots can be readily handled and coated with the absorbent and combustible tar and advantageously stored and shipped at pleasure and used advantageously for producing fires in stoves and furnaces.

Having thus set forth the purpose of my invention and the manner or method of its production the practical utility thereof will be obvious.

What I claim as new and desire to secure by Letters-Patent, is:

An artificial fuel comprising corn stalks, wood and vegetable matter, cords, oil and tar, united into fagots as set forth for the purposes stated.

ROBERT W. HOWELL.

Witnesses:
FRED DOHR,
HARRY H. WILSON.